（12) United States Patent  
Freitag et al.

(10) Patent No.: US 9,030,785 B2  
(45) Date of Patent: May 12, 2015

(54) NARROW READ-GAP HEAD WITH RECESSED AFM

(71) Applicant: HGST Netherlands B.V., Amsterdam (NL)

(72) Inventors: James Mac Freitag, Sunnyvale, CA (US); Zheng Gao, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/923,624

(22) Filed: Jun. 21, 2013

(65) Prior Publication Data

US 2014/0377589 A1 Dec. 25, 2014

(51) Int. Cl.  
*G11B 5/39* (2006.01)  
*G11B 5/31* (2006.01)

(52) U.S. Cl.  
CPC .............. *G11B 5/3143* (2013.01); *Y10T 428/11* (2015.01); *Y10T 428/115* (2015.01); *Y10T 428/1193* (2015.01)

(58) Field of Classification Search  
USPC .................................................... 360/324.11  
See application file for complete search history.

(56) References Cited

U.S. PATENT DOCUMENTS

| | | | |
|---|---|---|---|
| 6,741,432 B2 | 5/2004 | Pinarbasi | |
| 6,865,062 B2 | 3/2005 | Pinarbasi | |
| 7,092,221 B2 | 8/2006 | Gill | |
| 7,149,062 B2 | 12/2006 | Pinarbasi et al. | |
| 7,436,637 B2 * | 10/2008 | Pinarbasi | 360/324.11 |
| 7,511,926 B2 * | 3/2009 | Gill | 360/314 |
| 7,652,856 B2 * | 1/2010 | Pinarbasi | 360/324.11 |
| 7,679,866 B2 * | 3/2010 | Carey et al. | 360/324.11 |
| 7,961,440 B2 | 6/2011 | Gill et al. | |
| 8,018,691 B2 * | 9/2011 | Gill et al. | 360/324.12 |
| 8,270,125 B2 * | 9/2012 | Gill | 360/324.11 |
| 8,305,715 B2 | 11/2012 | Mauri et al. | |
| 2011/0273802 A1 | 11/2011 | Zhou et al. | |
| 2012/0276415 A1 | 11/2012 | Sapozhnikov et al. | |
| 2012/0320473 A1 | 12/2012 | Okamura et al. | |

OTHER PUBLICATIONS

Katsumi Hoshino et al.: "Applying Amorphus CoNbZr Shield to Improve the Dielectric-Breakdown Voltage of the Gap Layers of Narrow-Gap Read Heads"; IEEE Transactions on Magnetics, vol. 39, No. 5., Sep. 2003; Boston, MA; 3 pages.

M. Cyrille et al.: "Nano Processing Strategies for MR Sensor Read Width and Stripe Height Formation"; IEEE ,— international Magnetics Conference; May 2006; San Diego, CA; 1 page.

* cited by examiner

*Primary Examiner* — Mark Blouin  
(74) *Attorney, Agent, or Firm* — Patterson & Sheridan, LLP

(57) ABSTRACT

The embodiments of the present invention relate to a magnetic read head with pinned layers extending to the ABS of the read head and in contact with an antiferromagnetic layer that is recessed in relation to the ABS of the read head. The recessed antiferromagnetic layer may be disposed above or below the pinned layer structure and provides a pinning field to prevent amplitude flipping in head operation. In these embodiments of the present invention, the read gap of the sensor, that is the distance between the highly permeable, magnetically soft upper and lower shield layers at the ABS, is reduced by the thickness of the antiferromagnetic layer.

28 Claims, 8 Drawing Sheets

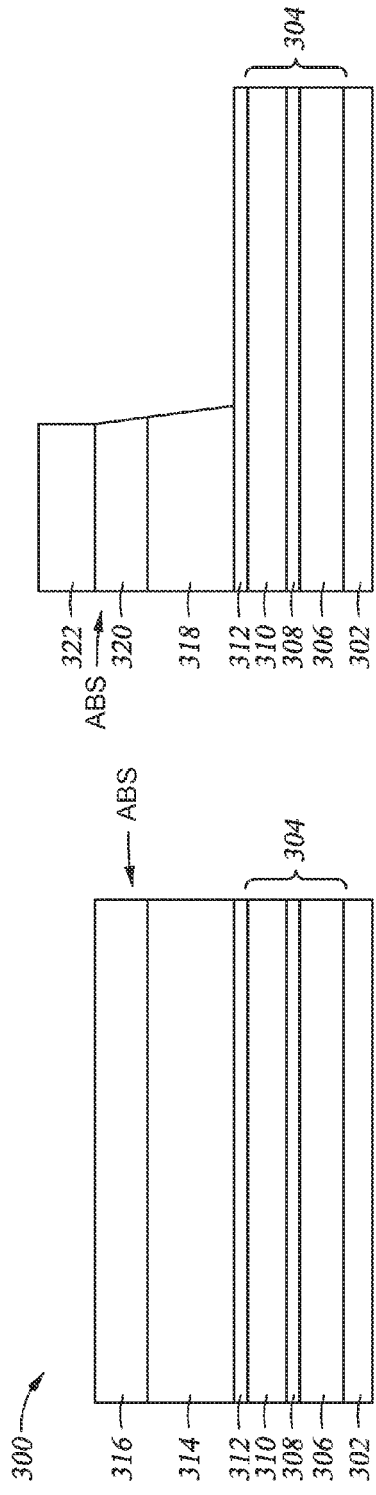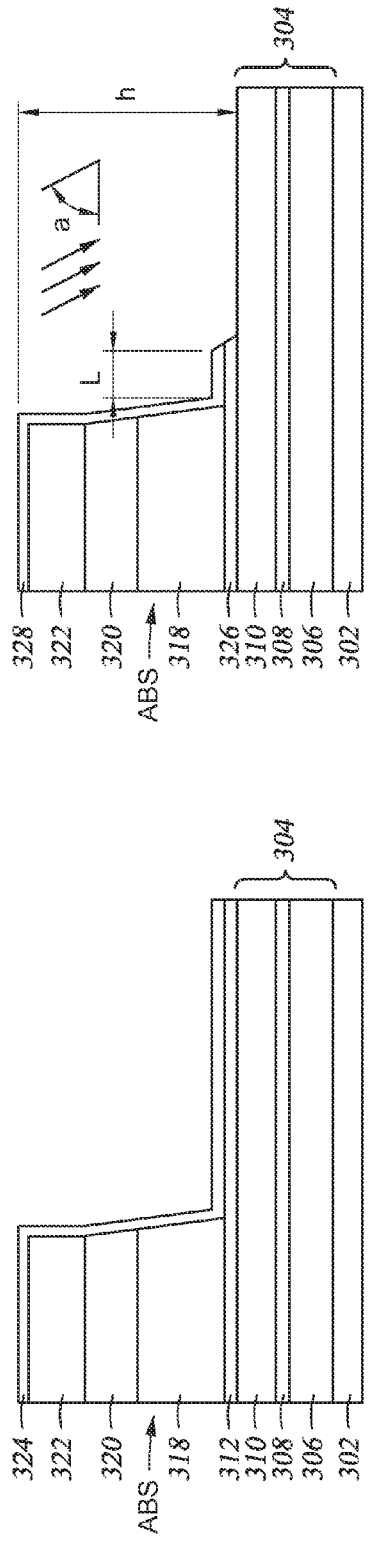

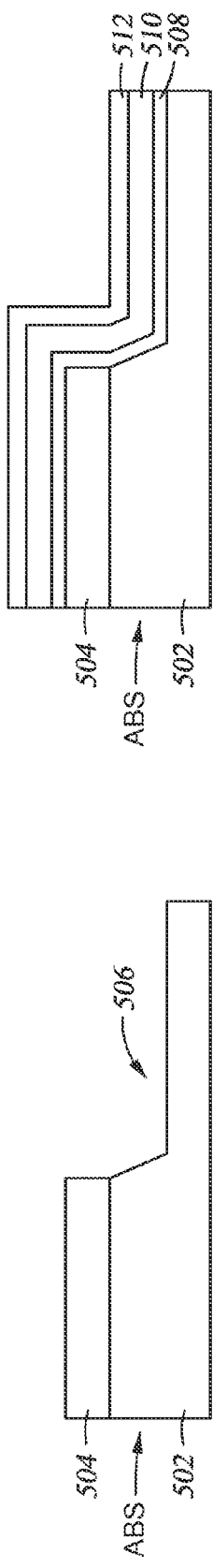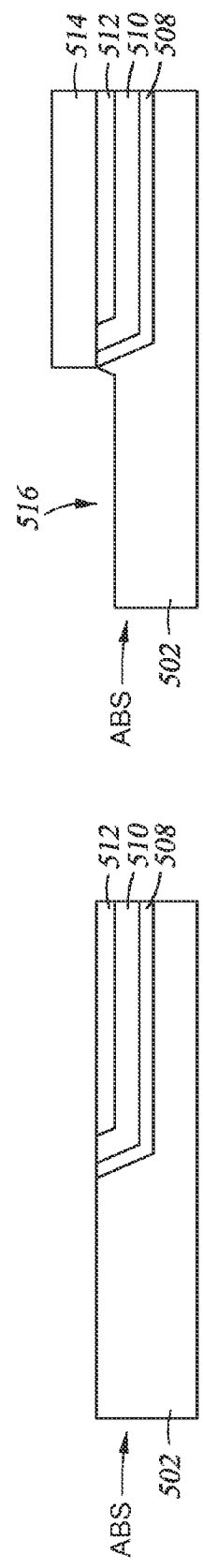

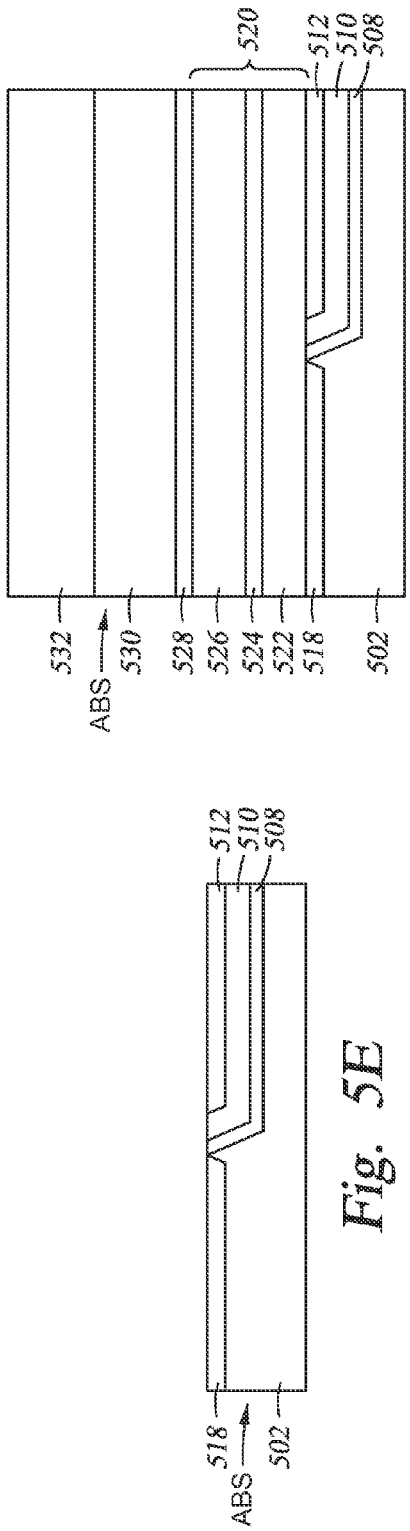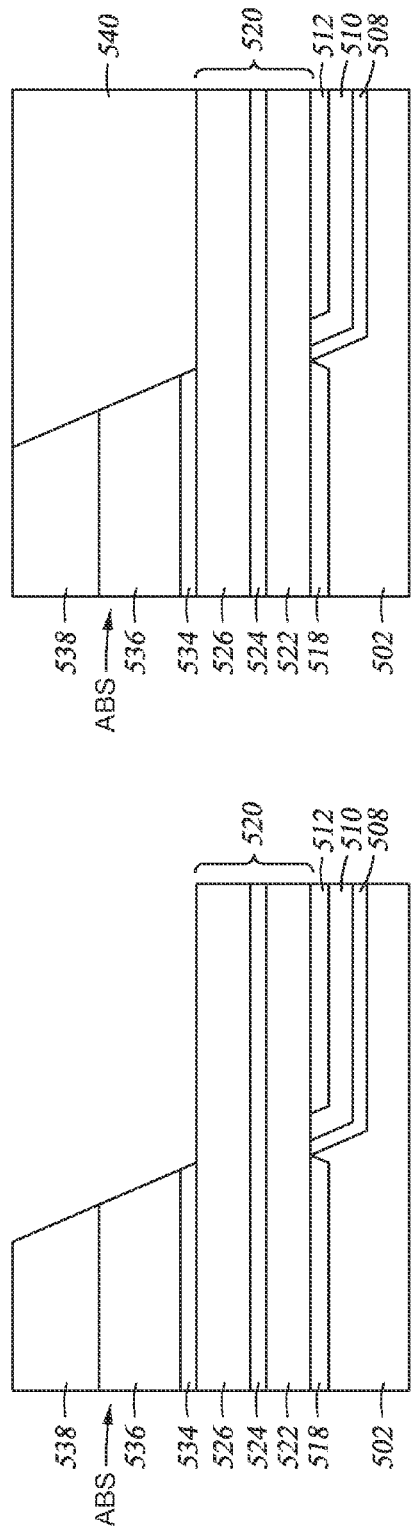

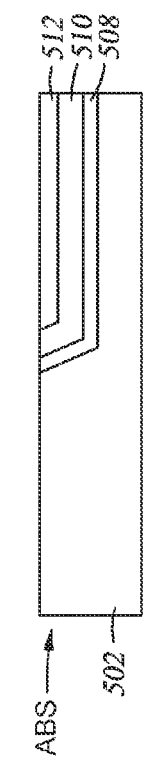
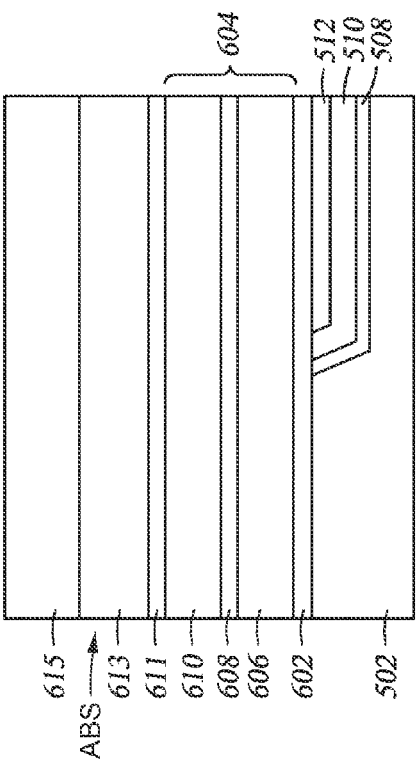
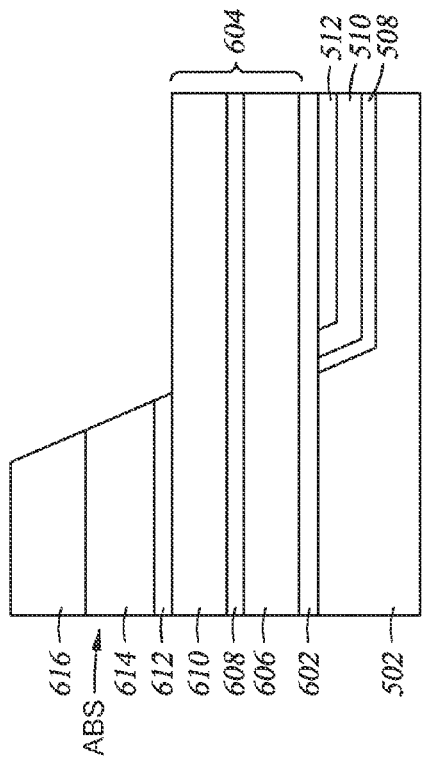
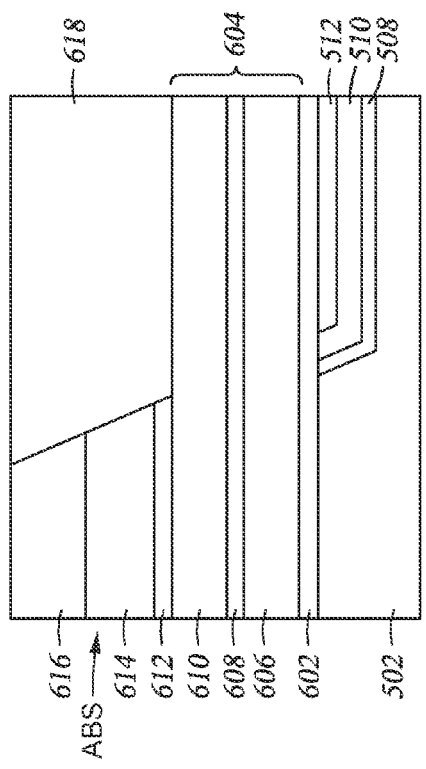

NARROW READ-GAP HEAD WITH RECESSED AFM

BACKGROUND

1. Field

Embodiments of the present invention generally relate to a magnetic read head for use in a hard disk drive.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

The read head typically utilizes a spin valve sensor, also referred to as a giant magnetoresistive (GMR) sensor. The sensor at the ABS typically includes a barrier layer sandwiched between a pinned layer and a free layer, and an antiferromagnetic layer for pinning the magnetization of the pinned layer. The magnetization of the pinned layer is pinned perpendicular to the ABS and the magnetic moment of the free layer is located parallel to the ABS, but free to rotate in response to external magnetic fields.

The need for ever increased data density is pushing researchers to develop data recording systems that can read and record ever smaller bit lengths in order to increase the density of data recorded on a magnetic medium. This has led to a push to decrease the gap thickness of a read head such as a GMR head. However, the amount by which such gap thickness can be decreased has been limited by physical limitations of sensors and also by the limitations of currently available manufacturing methods.

A self-pinned sensor in which the antiferromagnetic layer is reduced in thickness or removed completely so as to not provide a pinning field for the pinned layer structure provides a method to reduce read gap. The self-pinned sensor is, however, sensitive to magnetic disturbances caused, for instance, by a head-media impact, which may flip the polarity of the amplitude of the output signal from the read head. Such a failure would reduce the reliability of the recording system.

Therefore, there is a need for an improved magnetic head and method of manufacture that can reduce the read gap thickness while still preserving the reliability of the magnetic head.

SUMMARY OF THE INVENTION

The embodiments of the present invention relate to a magnetic read head with pinned layers extending to the ABS of the read head and in contact with an antiferromagnetic layer that is recessed in relation to the ABS of the read head. The recessed antiferromagnetic layer may be disposed above or below the pinned layer structure and provides a pinning field to prevent amplitude flipping in head operation. In these embodiments of the present invention, the read gap of the sensor, that is the distance between the highly permeable, magnetically soft upper and lower shield layers at the ABS, is reduced by the thickness of the antiferromagnetic layer.

In one embodiment, a magnetic head is disclosed. The magnetic head comprises a seed layer, and a pinned layer structure disposed over the seed layer. The pinned layer structure has an end extending to an air bearing surface. The magnetic head further comprises a free layer disposed over a first portion of the pinned layer structure and a ferromagnetic layer disposed over a second portion of the pinned layer structure adjacent to the first portion, wherein the ferromagnetic layer is recessed from the air bearing surface. The magnetic head further comprises an antiferromagnetic layer disposed over the ferromagnetic layer.

In another embodiment, a magnetic head is disclosed. The magnetic head comprises a seed layer, and a first magnetic layer disposed over the seed layer. The first magnetic layer has a first portion at an air bearing surface having a first thickness and a second portion recessed from the air bearing surface having a second thickness that is less than the first thickness. The magnetic head further comprises a nonmagnetic layer disposed over the first portion of the first magnetic layer, a second magnetic layer disposed over a first portion of the nonmagnetic layer, a ferromagnetic layer disposed over a second portion of the nonmagnetic layer and the second portion of the first magnetic layer, and an antiferromagnetic layer disposed over the ferromagnetic layer.

In another embodiment, a magnetic head is disclosed. The magnetic head comprises a shield having an end extending to an air bearing surface and a first trench recessed from the air bearing surface, a first seed layer disposed in the trench, an antiferromagnetic layer disposed in the trench and over the first seed layer, a ferromagnetic layer disposed in the trench and over the antiferromagnetic layer, and a pinned layer structure disposed over the shield, the first seed layer, the antiferromagnetic layer, and the ferromagnetic layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3F illustrate the process of making a magnetic read head according to one embodiment.

FIGS. 5A-5H illustrate the process of making a magnetic read head according to one embodiment.

FIGS. 6A-6E illustrate the process of making a magnetic read head according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The embodiments of the present invention relate to a magnetic read head with pinned layers extending to the ABS of the read head and in contact with an antiferromagnetic layer that is recessed in relation to the ABS of the read head. The recessed antiferromagnetic layer may be disposed above or below the pinned layer structure and provides a pinning field to prevent amplitude flipping in head operation. In these embodiments of the present invention, the read gap of the sensor, that is the distance between the highly permeable, magnetically soft upper and lower shield layers at the ABS, is reduced by the thickness of the antiferromagnetic layer.

Figure 1:
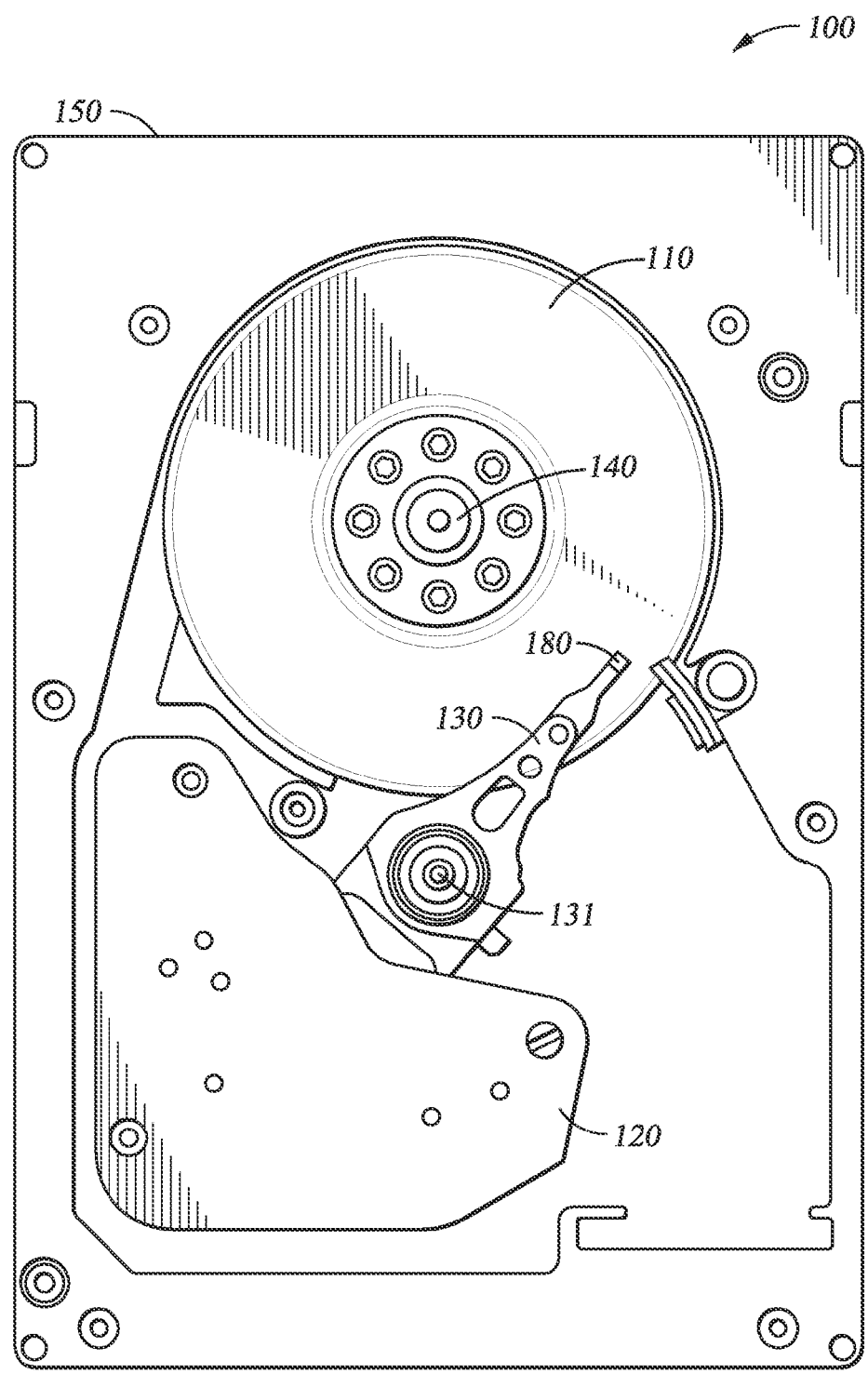
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2:
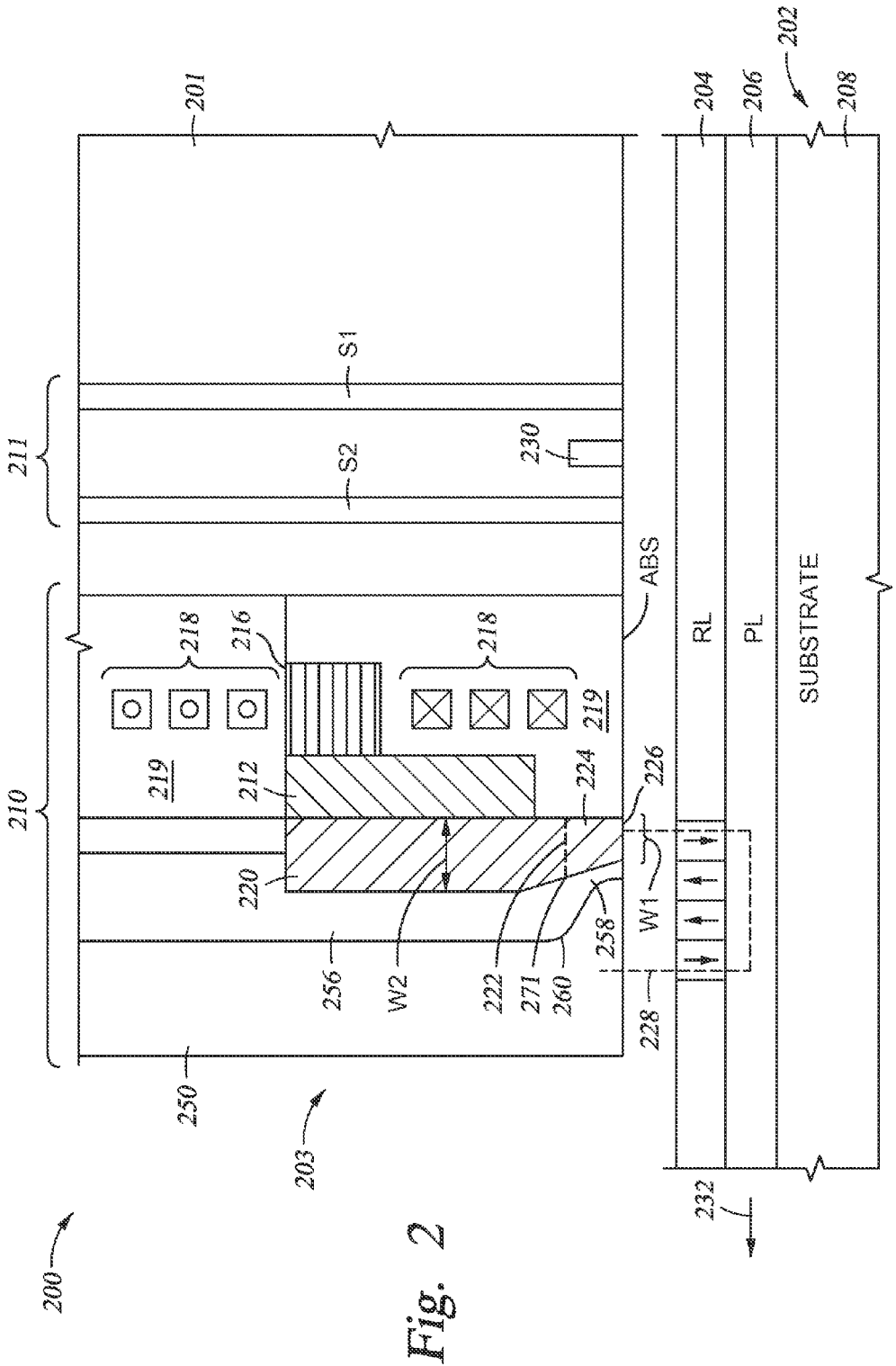
FIG. 2 is a side view of a read/write head and magnetic disk of the disk drive of FIG. 1, according to one embodiment of the invention.

FIG. 2 is a fragmented, cross-sectional side view through the center of a read/write head 200 mounted on a slider 201 and facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS, a magnetic write head 210 and a magnetic read head 211, and is mounted such that the ABS is facing the magnetic disk 202. In FIG. 2, the disk 202 moves past the write head 210 in the direction indicated by the arrow 232, so the portion of slider 201 that supports the read/write head 200 is often called the slider "trailing" end 203.

The magnetic read head 211 is a MR read head that includes a MR sensing element 230 located between MR shields S1 and S2, which are composed of a highly permeable and magnetically soft material such as permalloy. The distance between S1 and S2, which is the sensor thickness, defines the read gap of the read head. The RL 204 is illustrated with perpendicularly recorded or magnetized regions, with adjacent regions having magnetization directions, as represented by the arrows located in the RL 204. The magnetic fields of the adjacent magnetized regions are detectable by the MR sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Write pole 220 is a flared write pole and includes a flare point 222 and a pole tip 224 that includes an end 226 that defines part of the ABS. The flare may extend the entire height of write pole 220 (i.e., from the end 226 of the write pole 220 to the top of the write pole 220), or may only extend from the flare point 222, as shown in FIG. 2. In one embodiment the distance between the flare point 222 and the ABS is between about 30 nm and about 150 nm.

The write pole 220 includes a tapered surface 271 which increases a width of the write pole 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2, in alternative embodiment, the tapered region 271 may include a plurality of tapered surface with different taper angles with respect to the ABS.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to desirable regions of the RL 204.

FIG. 2 further illustrates one embodiment of the upper return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2 is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the write pole 220 and the magnetic shield 250 at the ABS.

The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a final thickness at a second distance (greater than the first distance) from the ABS.

Figure 3F:
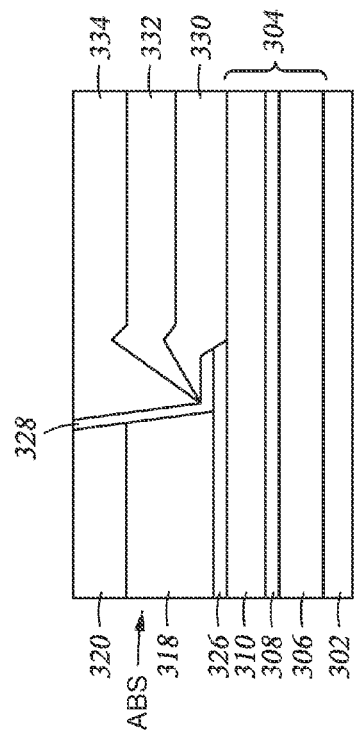
Figure 4B:
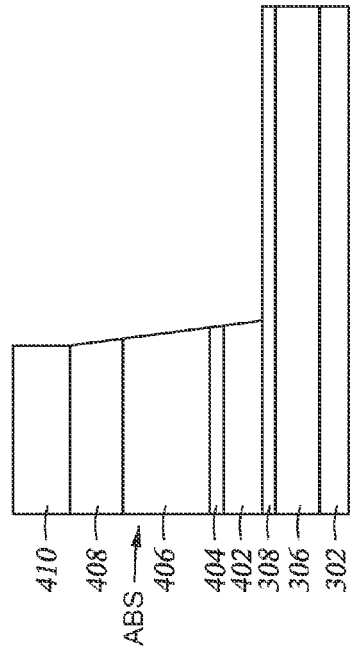
FIGS. 4A-4F illustrate the process of making a magnetic read head according to one embodiment.

FIGS. 3A-3F illustrate the process of making the magnetic read head 211 according to one embodiment. FIG. 3A is a cross-sectional side view of a sensor stack 300. The sensor stack 300 includes a seed layer 302, a pinned layer structure 304, a spacer layer 312, a free layer 314, and a capping layer 316. All of the layers extend to the ABS. The seed layer 302 may comprise a Ta or Ru layer, or a layered structure having a Ta layer and a Ru layer. The seed layer 302 may have a thickness of less than 4 nanometers (nm), such as 2 nm, which is less than the thickness of a seed layer in a sensor stack with an antiferromagnetic layer at the ABS. The pinned layer structure 304 may comprise an antiparallel (AP) pinned structure having a first magnetic layer 306, a second magnetic layer 310, and a nonmagnetic AP coupling layer 308 sandwiched between the two magnetic layers 306, 310. The first and second magnetic layers 306, 310 may be constructed of several magnetic materials such as, for example NiFe, CoFe, CoFeB, Co, CoZr, CoHf, or CoFeTaB. The nonmagnetic layer 308 may comprise Ru.

The spacer layer 312 may comprise an insulating material such as MgO, TiO2 or alumina, or a metallic spacer layer such as Cu, Ag, or AgSn for current perpendicular to the plane (CPP)-GMR sensors. The free layer 314 may comprise ferromagnetic material such as Co, CoFe, CoFeB, NiFe, CoHf or combinations thereof. The capping layer 316 may comprise a material such as Ru Ta. or a layered structure of these materials, to protect the sensor from damage.

The sensor stack 300 may be a self-pinned sensor, since an antiferromagnetic layer is not present in the sensor stack. The self-pinned sensor may have a reduced read gap thickness (i.e., reduced sensor stack thickness), but without an antiferromagnetic layer there is a risk of amplitude flipping. A different sensor stack may include an antiferromagnetic layer at the ABS, but the antiferromagnetic layer at the ABS contributes to the total thickness of the read gap. Embodiments of the present invention disclose an improved magnetic read head having an antiferromagnetic layer that is recessed from the ABS. Consequently, the read gap thickness is reduced and the sensor performance is improved.

As shown in FIG. 3B, a mask layer 322 is deposited over a portion of the capping layer 316, leaving a portion of the capping layer 316 away from the ABS exposed. The exposed portion of the capping layer 316 and a portion of the free layer 314 not covered by the mask layer 322 are removed, exposing a portion of the spacer layer 312. A free layer 318 and a capping layer 320 are formed. The removal may be performed by of one or more ion milling processes. The side wall of the free layer 318 and the capping layer 320 opposite the ABS may be slightly non-vertical, as a result of the ion milling process.

Next, as shown in FIG. 3C, an insulation layer 324 is conformally deposited over the mask layer 322, the exposed portion of the spacer layer 312, the side walls of the mask layer 322, the capping layer 320 and the free layer 318. The side walls covered by the insulation layer 324 are away from the ABS. The insulation layer 324 may comprise an insulating material such as MgO or alumina.

A portion of the insulation layer 324 and a portion of the spacer layer 312 are removed to expose a portion of the pinned layer structure 304, as shown in FIG. 3D. The removal may be performed by an oblique angle static ion mill. A remaining insulation layer 328 has a portion having a length "L" disposed over a remaining spacer layer 326. The length "L" approximately equals the thickness "h" divided by the tangent of "a", where "a" is the ion milling angle.

Figure 3E:
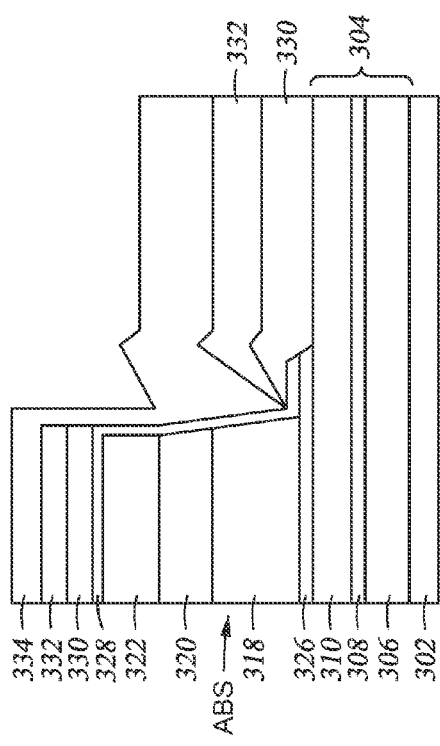

Next, as shown in FIG. 3E, a ferromagnetic stitch layer 330 is deposited over the remaining insulation layer 328, the exposed portion of the pinned layer structure 304, and the side wall of the remaining insulation layer 328 and the remaining spacer layer 326. The ferromagnetic stitch layer 330 is disposed adjacent the free layer 318 which is disposed over the portion of the pinned layer structure 304 at the ABS, but separated and electrically isolated from the free layer 318 by the remaining insulation layer 328. An antiferromagnetic layer 332 is deposited over the ferromagnetic stitch layer 330. Both layers 330, 332 may be deposited using directional or collimated vapor deposition source such as ion beam deposition (IBD) to limit deposition of conducting material on the sidewall. The ferromagnetic stitch layer 330 and the antiferromagnetic layer 332 are also deposited over the remaining insulation layer 328 that is disposed over the mask layer 322. The ferromagnetic stitch layer 330 may comprise a magnetic material such as CoFe, Co, CoHf, CoZr, CoFeB, or combinations thereof and the antiferromagnetic layer 332 may include materials such as platinum, iridium, rhodium, nickel, iron, manganese, or combinations thereof. A dielectric refill 334 is deposited over the antiferromagnetic layer 332 and the remaining insulation layer 328. Lastly, as shown in FIG. 3F, the mask layer 322 and the layers disposed over the mask layer 322 are removed and the dielectric refill 334 is planarized to be planar with the capping layer 320.

As shown in FIG. 3F, the antiferromagnetic layer 332 and the ferromagnetic stitch layer 330 are recessed from the ABS, thus not contributing to the thickness of the read gap. The free layer 318 is disposed over a first portion of the pinned layer structure 304 and the ferromagnetic stitch layer 330 is disposed over a second portion of the pinned layer structure. The remaining spacer layer 326 is disposed over at least a portion of the first and second portions of the pinned layer structure 304, and the free layer 318 is disposed over a first portion of the remaining spacer layer 326. A portion of the remaining insulation layer 328 is disposed over a second portion of the remaining spacer layer 326, and a portion of the ferromagnetic stitch layer 330 is disposed over that portion of the remaining insulation layer 328. In a finished magnetic head, the dielectric refill 334, the antiferromagnetic layer 332, ferromagnetic stitch layer 330, and second portion of the pinned layer structure 304 are wider in the trackwidth direction (into the paper) than the capping layer 320, free layer 318, remaining spacer layer 326, and first portion of the pinned layer structure 304.

Figure 4A:
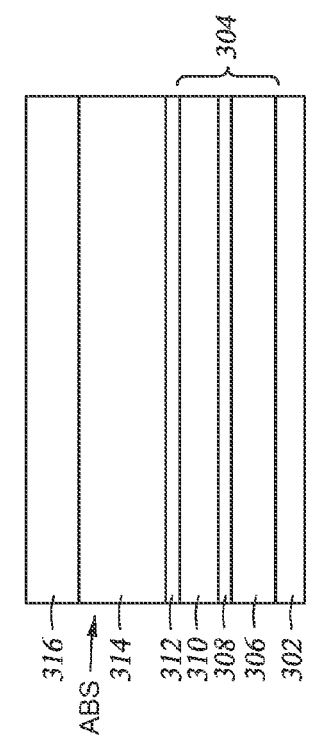

FIGS. 4A-4F illustrate the process of making the magnetic read head 211 according to one embodiment. FIG. 4A shows the sensor stack 300 described in FIG. 3A. As shown in FIG.

4B, a mask layer 410 is deposited over a portion of the capping layer 316, leaving a portion of the capping layer 316 away from the ABS exposed. The exposed portion of the capping layer 316, a portion of the free layer 314, the spacer layer 312 and the second magnetic layer 310 not covered by the mask layer 410 are removed, exposing a portion of the nonmagnetic layer 308. A capping layer 408, a free layer 406, a spacer layer 404 and a magnetic layer 402 are formed. The removal of the portions of the layers may be performed by one or more ion milling processes. The side wall of the capping layer 408, the free layer 406, the spacer layer 404 and the magnetic layer 402 opposite the ABS may be slightly non-vertical, as the result of the ion milling process.

Figure 4C:
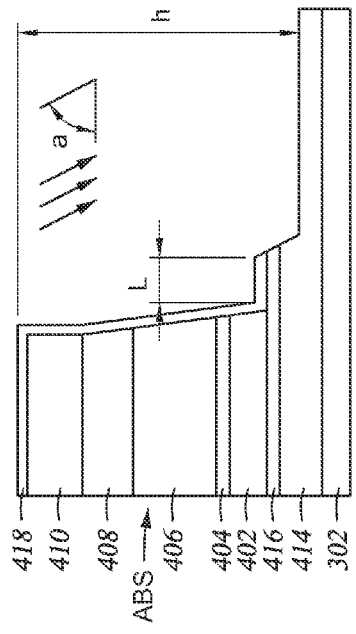

Next, as shown in FIG. 4C, an insulation layer 412 is deposited over the mask layer 410, the exposed portion of the nonmagnetic layer 308, and the side wall of the mask layer 410, the capping layer 408, the free layer 406, the spacer layer 404, and the magnetic layer 402. The side walls covered by the insulation layer 412 are away from the ABS. The insulation layer 412 may comprise an insulating material such as MgO or alumina.

Figure 4D:
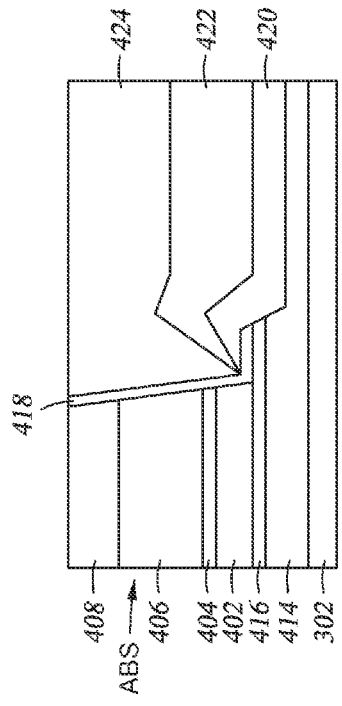

A portion of the insulation layer 412, a portion of the nonmagnetic layer 308, and a portion of the first magnetic layer 306 are removed to expose a portion of the first magnetic layer 306, as shown in FIG. 4D. The exposed portion of the first magnetic layer 306 is away from the ABS. The remaining first magnetic layer 414 has a first portion at the ABS having a first thickness and an exposed portion away from the ABS having a second thickness. The second thickness is less than the first thickness. The removal may be performed by an oblique angle static ion mill. A remaining insulation layer 418 has a portion having a length "L" that is disposed over a remaining nonmagnetic layer 416. The length "L" approximately equals the thickness "h" divided by the tangent of "a", where "a" is the ion milling angle.

Figure 4E:
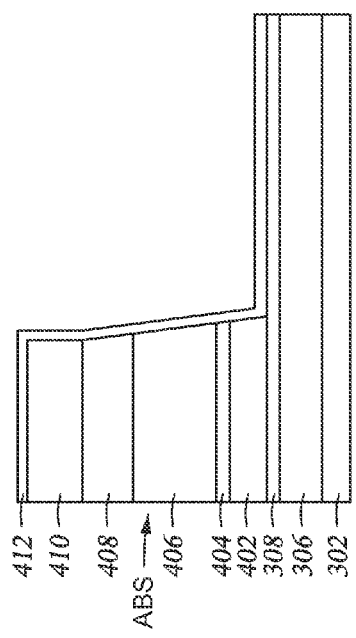

Next, as shown in FIG. 4E, a ferromagnetic stitch layer 420 is deposited over the remaining insulation layer 418, the exposed portion of the first magnetic layer 306, and the side wall of the remaining insulation layer 418 and the remaining nonmagnetic layer 416. An antiferromagnetic layer 422 is deposited over the ferromagnetic stitch layer 420. Both layers 422, 420 may be deposited using directional ion beam deposition (IBD). The ferromagnetic stitch layer 420 and the antiferromagnetic layer 422 are also deposited over the remaining insulation layer 418 that is disposed over the mask layer 410. The ferromagnetic stitch layer 420 may be a magnetic material such as CoFe, and the antiferromagnetic layer 422 may include materials such as platinum, iridium, rhodium, nickel, iron, manganese, or combinations thereof. A dielectric refill 424 is deposited over the antiferromagnetic layer 422 and the remaining insulation layer 418.

Figure 4F:
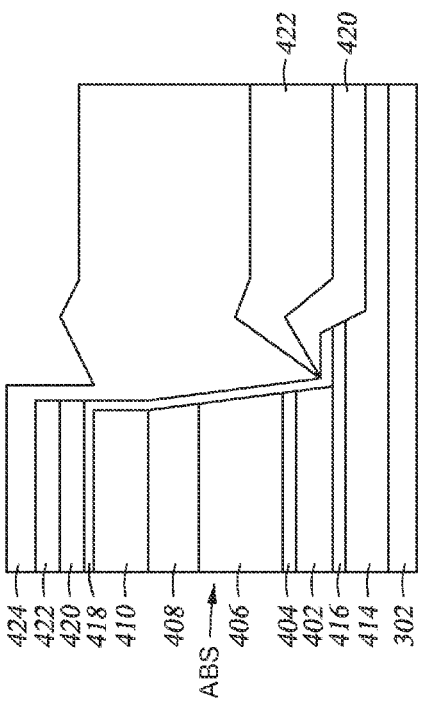

Lastly, as shown in FIG. 4F, the mask layer 410 and the layers disposed over the mask layer 410 are removed and the dielectric refill 424 is planarized to be planar with the capping layer 408. As shown in FIG. 4F, the antiferromagnetic layer 422 and the ferromagnetic stitch layer 420 are recessed from the ABS, thus not contributing to the thickness of the read gap. The nonmagnetic layer 416 is disposed over a first portion of the remaining first magnetic layer 414, and the magnetic layer 402 is disposed over a first portion of the nonmagnetic layer 416. A portion of the insulation layer 418 is disposed over the second portion of the nonmagnetic layer 416, and the ferromagnetic stitch layer 420 is disposed over the second portion of the remaining first magnetic layer 414 and the portion of the insulation layer 418 that is disposed over the second portion of the nonmagnetic layer 416. In a finished magnetic head, the dielectric refill 424, the antiferromagnetic layer 422, ferromagnetic stitch layer 420, and second portion of the remaining first magnetic layer 414 are wider in the trackwidth direction than the capping layer 408, free layer 406, spacer layer 404, and magnetic layer 402.

FIGS. 3A-3F and 4A-4F illustrate processes of making a magnetic read head having a recessed antiferromagnetic layer that is top stitched, meaning the antiferromagnetic layer is disposed over the ferromagnetic stitch layer. The magnetic read head has an antiferromagnetic layer disposed over a ferromagnetic stitch layer, both layers are recessed from the ABS, and the ferromagnetic stitch layer is partially disposed over a spacer layer and partially disposed over a magnetic layer. Alternatively, a magnetic read head may have a recessed antiferromagnetic layer that is bottom stitched, meaning the antiferromagnetic layer is disposed under the ferromagnetic stitch layer. One exemplary process of making such a magnetic read head is described below.

FIGS. 5A-5H illustrate the process of making a magnetic read head having a bottom stitched recessed antiferromagnetic layer according to one of the embodiments. As shown in FIG. 5A, a mask layer 504 is disposed over a portion of a shield 502, and a portion of the shield 502 not covered by the mask layer 504 is removed by an ion milling process, forming a trench 506 in the shield 502 away from the ABS. A seed layer 508 is deposited over the mask layer 504 and into the trench 506, as shown in FIG. 5B. The seed layer 508 may comprise Ta or Ru. An antiferromagnetic layer 510 is deposited over the seed layer 508, and a ferromagnetic stitch layer 512 is deposited over the antiferromagnetic layer 510. The ferromagnetic stitch layer 512 may comprise a magnetic material such as CoFe, and the antiferromagnetic layer 510 may include materials such as platinum, iridium, rhodium, nickel, iron, manganese, or combinations thereof. Next, the mask layer 504 and the layers disposed over the mask layer 504 are removed by a liftoff process, leaving a structure as shown in FIG. 5C.

A mask layer 514 is deposited over the seed layer 508, the antiferromagnetic layer 510 and the ferromagnetic stitch layer 512, as shown in FIG. 5D. A second trench 516 is formed by removing a portion of the shield 502 not covered by the mask layer 514 using an ion milling process. The second trench 516 extends from the ABS to the trench 506, which is now filled with the seed layer 508, the antiferromagnetic layer 510 and the ferromagnetic stitch layer 512. A second seed layer 518 is then deposited into the second trench 516, and the mask 514 is removed, as shown in FIG. 5E. The second seed layer 518 may be Ta, Ru or a layered stack.

Next, as shown in FIG. 5F, a pinned layer structure 520 is deposited over the second seed layer 518, the seed layer 508, the antiferromagnetic layer 510 and the ferromagnetic stitch layer 512. The pinned layer structure 520 may be an AP pinned structure having a first magnetic layer 522, a second magnetic layer 526, and a nonmagnetic AP coupling layer 524 sandwiched between the two magnetic layers 522, 526. The first and second magnetic layers 522, 526 may be constructed of several magnetic materials such as, for example NiFe or CoFe. The nonmagnetic layer 524 may comprise Ru. In one embodiment, the first magnetic layer 522 is in contact with the second seed layer 518 and the ferromagnetic stitch layer 512, and, on the trench sidewall, the first magnetic layer 522 is also in contact with the seed layer 508 and the antiferromagnetic layer 510.

Deposited over the pinned layer structure 520 is a spacer layer 528. The spacer layer 528 may comprise an insulating material such as MgO, TiO2, or alumina, or a metallic spacer layer comprised of Cu, Ag, or AgSn. A free layer 530 is deposited over the spacer layer 528. The free layer 530 may comprise a ferromagnetic material such as Co, CoFe, CoFeB, NiFe or combinations thereof. A capping layer 532 is deposited over the free layer 530. The capping layer 532 may comprise a material, such as Ru, Ta, or a layered structure to protect the sensor from damage.

A portion of the capping layer 532, the free layer 530, and the spacer layer 528 are removed using an ion milling process to expose a portion of the pinned layer structure 520 that is away from the ABS, as shown in FIG. 5G. A capping layer 538, a free layer 536, and a spacer layer 534 are formed. Next, a dielectric refill 540 is deposited over the exposed portion of the pinned layer structure 520 and over the side wall of the capping layer 538, the free layer 536 and the spacer layer 534, as shown in FIG. 5H. In a finished magnetic head, the dielectric refill 540, antiferromagnetic layer 510, and ferromagnetic stitch layer 512 are wider in the trackwidth direction than the capping layer 538, free layer 536, and spacer layer 534. The structure shown in FIG. 5H illustrates a magnetic read head having a bottom stitched antiferromagnetic layer that is recessed from the ABS.

FIGS. 6A-6E illustrate the process of making a magnetic read head according to one embodiment. As shown in FIG. 6A, the process starts with the structure shown in FIG. 5C. Instead of forming a second trench in the shield 502, a nonmagnetic layer 602 is deposited over the shield 502, the seed layer 508, the antiferromagnetic layer 510 and the ferromagnetic stitch layer 512, as shown in FIG. 6B. The nonmagnetic layer 602 may comprise Ru and may have a thickness in a range from 1 nm to 2 nm. The nonmagnetic layer 602 may comprises a platinum group metal such as Ru, Ir, Pt, Os, Rh, or Pd. In one embodiment, the nonmagnetic layer 602 is in contact with the shield 502, the seed layer 508, the antiferromagnetic layer 510 and the ferromagnetic stitch layer 512.

Next, as shown in FIG. 6C, a pinned layer structure 604 is deposited over the nonmagnetic layer 602. The pinned layer structure 604 may be an AP pinned structure having a first magnetic layer 606, a second magnetic layer 610, and a nonmagnetic AP coupling layer 608 sandwiched between the two magnetic layers 606, 610. The first and second magnetic layers 606, 610 may be constructed of several magnetic materials such as, for example NiFe, CoFe, CoFeB, Co, CoZr, CoHf, or CoFeTaB. The nonmagnetic layer 608 may comprise Ru. A spacer layer 611 is deposited over the pinned layer structure 604, a free layer 613 is deposited over the spacer layer 611, and a capping layer 615 is deposited over the free layer 613. The spacer layer 611 may comprise an insulating material such as MgO, TiO2 or alumina or a metallic spacer comprised of Cu, Ag, or AgSn. The free layer 613 may comprise a ferromagnetic material such as Co, CoFe, CoFeB, NiFe, CoHf or combinations thereof. The capping layer 615 may comprise a material, such as Ru or Ta, to protect the sensor from damage.

A portion of the capping layer 615, the free layer 613, and the spacer layer 611 are removed using an ion milling process to expose a portion of the pinned layer structure 604 that is away from the ABS, as shown in FIG. 6D. A capping layer 616, a free layer 614, and a spacer layer 612 are formed. Next, a dielectric refill 618 is disposed over the exposed portion of the pinned layer structure 604 and over the side wall of the capping layer 616, the free layer 614 and the spacer layer 612, as shown in FIG. 6E. In a finished magnetic head, the dielectric refill 618, antiferromagnetic layer 510, and ferromagnetic stitch layer 512 are wider in the trackwidth direction than the capping layer 616, free layer 614, and spacer layer 612.

In summary, a magnetic read head having an antiferromagnetic layer recessed from the ABS is disclosed. The antiferromagnetic layer may be top stitched or bottom stitched. The antiferromagnetic layer is recessed from the ABS, thus not contributing to the thickness of the read gap. The structures disclosed herein may not be limited for use in a magnetic read head. The structures may be also used in any magnetic device such as all magnetic sensors, magnetoresistive random-access memory (MRAM) or magnetic recording heads.

While the foregoing is directed to embodiments of the present invention, other and further embodiments of the invention may be devised without departing from the basic scope thereof, and the scope thereof is determined by the claims that follow.

What is claimed is:

1. A magnetic device, comprising:
   a seed layer;
   a pinned layer structure disposed over the seed layer, wherein the pinned layer structure has a first portion extending to an air bearing surface;
   a ferromagnetic layer disposed over a second portion of the pinned layer structure adjacent to the first portion, wherein the ferromagnetic layer is recessed from the air bearing surface;
   an antiferromagnetic layer disposed over the ferromagnetic layer;
   a spacer layer disposed over at least a portion of the first portion and the second portion of the pinned layer structure,
   a free layer disposed over a first portion of the spacer layer;
   a capping layer disposed over the free layer;
   an insulation layer disposed over a side wall of the capping layer, a side wall of the free layer, and a second portion of the spacer layer, wherein the ferromagnetic layer is disposed over a portion of the insulation layer; and
   a dielectric layer disposed over the antiferromagnetic layer.

2. The magnetic device of claim 1, wherein the dielectric layer, the antiferromagnetic layer and the ferromagnetic layer have a width in a trackwidth direction that is greater than a width of the capping layer, the free layer and the spacer layer.

3. The magnetic device of claim 1, wherein the spacer layer comprises a material selected from the group consisting of MgO, TiO$_2$, Al$_2$O$_3$ or a material selected from the group consisting of Cu, Ag, AgSn, and combinations thereof.

4. A magnetic device, comprising:
   a seed layer;
   a first magnetic layer disposed over the seed layer, wherein the first magnetic layer has a first portion at an air bearing surface having a first thickness and a second portion recessed from the air bearing surface having a second thickness that is less than the first thickness;
   a nonmagnetic layer disposed over the first portion of the first magnetic layer;
   a second magnetic layer disposed over a first portion of the nonmagnetic layer;
   a ferromagnetic layer disposed over a second portion of the first magnetic layer; and
   an antiferromagnetic layer disposed over the ferromagnetic layer.

5. The magnetic device of claim 4, further comprising:
   a spacer layer disposed over the second magnetic layer;
   a free layer disposed over the spacer layer; and
   a capping layer disposed over the free layer.

6. The magnetic device of claim 4 wherein the nonmagnetic layer comprises Ru.

7. The magnetic device of claim 5, wherein the spacer layer comprises a material selected from the group consisting of MgO, TiO$_2$, and Al$_2$O$_3$ or a material selected from the group consisting of Cu, Ag, AgSn, and combinations thereof.

8. The magnetic device of claim 5, further comprising:
an insulation layer disposed over a second portion of the nonmagnetic layer, a side wall of the capping layer, a side wall of the free layer, a side wall of the spacer layer, and a side wall of the second magnetic layer, wherein the ferromagnetic layer is disposed over a portion of the insulation layer; and
a dielectric layer disposed over the antiferromagnetic layer.

9. The magnetic device of claim 8, wherein the dielectric layer, the antiferromagnetic layer and the ferromagnetic layer have a width in a trackwidth direction that is greater than a width of the capping layer, the free layer and the spacer layer.

10. The magnetic device of claim 4, wherein the seed layer has a thickness of less than about 4 nm.

11. The magnetic device of claim 4, wherein the ferromagnetic layer comprises a material selected from the group consisting of CoFe, Co, CoHf, CoZr, CoFeB, and combinations thereof.

12. The magnetic device of claim 4, wherein the antiferromagnetic layer comprises a material selected from the group consisting of platinum, iridium, rhodium, nickel, iron, manganese, and combinations thereof.

13. A magnetic device, comprising:
a shield having a first portion extending to an air bearing surface and a second portion recessed from the air bearing surface, wherein the first portion has a thickness that is greater than the thickness of the second portion;
a first seed layer disposed on the second portion of the shield;
an antiferromagnetic layer disposed over the first seed layer;
a ferromagnetic layer disposed over the antiferromagnetic layer, wherein the antiferromagnetic layer and the ferromagnetic layer are recessed from the air bearing surface; and
a pinned layer structure disposed over the first portion of the shield, and the recessed ferromagnetic layer.

14. The magnetic device of claim 13, further comprising:
a second seed layer disposed over the first portion of the shield; and
a pinned layer structure disposed over the second seed layer and the recessed ferromagnetic layer.

15. The magnetic device of claim 14, further comprising:
a spacer layer disposed over a first portion of the pinned layer structure;
a free layer disposed over the spacer layer;
a capping layer disposed over the free layer; and
a dielectric layer disposed over a second portion of the pinned layer structure.

16. The magnetic device of claim 15, wherein the dielectric layer, the antiferromagnetic layer and the ferromagnetic layer have a width in a trackwidth direction that is greater than a width of the capping layer, the free layer and the spacer layer.

17. The magnetic device of claim 15, wherein the spacer layer comprises a material selected from the group consisting of MgO, $TiO_2$, and $Al_2O_3$ or a material selected from the group consisting of Cu, Ag, AgSn, and combinations thereof.

18. The magnetic device of claim 13, wherein the pinned layer structure comprises a first magnetic layer, a second magnetic layer, and a nonmagnetic layer sandwiched between the first and second magnetic layers.

19. The magnetic device of claim 18, wherein the nonmagnetic layer comprises Ru.

20. The magnetic device of claim 13, wherein the ferromagnetic layer comprises a material selected from the group consisting of CoFe, Co, CoHf, CoZr, CoFeB, and combinations thereof.

21. The magnetic device of claim 13, wherein the antiferromagnetic layer comprises a material selected from the group consisting of platinum, iridium, rhodium, nickel, iron, manganese, and combinations thereof.

22. The magnetic device of claim 13, further comprising:
a nonmagnetic layer disposed over the first portion of the shield and the recessed ferromagnetic layer, wherein the pinned layer structure is disposed over the nonmagnetic layer.

23. The magnetic device of claim 22, further comprising:
a spacer layer disposed over a first portion of the pinned layer structure;
a free layer disposed over the spacer layer;
a capping layer disposed over the free layer; and
a dielectric layer disposed over a second portion of the pinned layer structure.

24. The magnetic device of claim 23, wherein the dielectric layer, the antiferromagnetic layer and the ferromagnetic layer have a width in a trackwidth direction that is greater than a width of the capping layer, the free layer and the spacer layer.

25. The magnetic device of claim 23, wherein the spacer layer comprises a material selected from the group consisting of MgO, $TiO_2$, and $Al_2O_3$ or a material selected from the group consisting of Cu, Ag, AgSn, and combinations thereof.

26. The magnetic device of claim 22, wherein the nonmagnetic layer comprises a material selected from the group consisting of Ru, Ir, Pt, Os, Rh, and Pd.

27. The magnetic device of claim 22, wherein the nonmagnetic layer comprises Ru.

28. The magnetic device of claim 27, wherein the nonmagnetic layer has a thickness in the range from about 1 to 2 nm.

* * * * *